United States Patent [19]

Wraight

[11] Patent Number: 5,124,844
[45] Date of Patent: Jun. 23, 1992

[54] METHOD AND APPARATUS FOR LOCATING CELESTIAL OBJECTS

[76] Inventor: Peter D. Wraight, 3030 Bonney Briar Dr., Missouri City, Tex. 77459

[21] Appl. No.: 705,769

[22] Filed: May 28, 1991

[51] Int. Cl.⁵ .......................................... G02B 27/14
[52] U.S. Cl. ................. 359/635; 33/275 R; 33/277; 356/8; 356/153; 356/255
[58] Field of Search ............... 350/537, 557, 566, 567, 350/174; 356/8, 153, 251, 255; 33/228, 275 R, 277

[56] References Cited

U.S. PATENT DOCUMENTS

| | | | |
|---|---|---|---|
| 4,260,253 | 4/1981 | Tuthill | 356/153 |
| 4,436,421 | 3/1984 | Suzuki | 356/153 |
| 4,749,271 | 6/1988 | Nagler | 356/255 |
| 4,828,377 | 5/1989 | Putland | 350/537 |
| 4,912,853 | 4/1990 | McDonnell et al. | 33/277 |

*Primary Examiner*—Bruce Y. Arnold
*Assistant Examiner*—J. P. Ryan

[57] ABSTRACT

A method and an apparatus for locating in the sky celestial objects, using a telescope, wherein two guide stars and the celestial object are represented, according to their respective locations, on a disc which is able to rotate with respect to the telescope around an axis, orthogonal to the telescope axis, and passing through the representation of the celestial objects. The images of the two guide stars are projected in the sky and the telescope and the disc are moved until the images of the guide stars are superposed with the respective actual guide stars in the sky.

The guide stars form a triangle with the celestial object. The telescope is preferably provided with a alt-azimuth type mounting. The guide stars are represented on the disc by small holes. A light source placed under the disc creates light dots which are projected in the sky using a plano convex lens optically aligned with the disc rotation axis, and a semi-transparent mirror inclined at 45 degrees on the rotation axis.

19 Claims, 6 Drawing Sheets

METHOD AND APPARATUS FOR LOCATING CELESTIAL OBJECTS

BACKGROUND OF THE INVENTION

1. Field of the Invention

The present invention relates to a method and apparatus which enables deep-sky objects to be found by using as a reference only the bright, easily recognizable, stars of 3rd magnitude or brighter. The method can advantageously be implemented on telescopes using an alt-azimuth mounting system, commonly known as a Dobsonian mounting.

2. Related Art

Finding deep-sky objects can be a difficult and frustrating task for beginners in amateur astronomy (also called "backyard astronomy"), especially in the light polluted skies that exist around our major cities. The known way, in backyard astronomy, to find deep-sky objects in the sky, when using an alt-azimuth mounted telescope, is to use the bright, easily visible, stars as a guide. However, the number of easily visible stars, i.e. brighter than 3rd magnitude, is relatively limited and it is very hard to move the telescope several degrees (e.g. 15 degrees) from one star and several degrees (e.g. 17 degrees) from another in order to locate a deep-sky object.

Initially a novice amateur astronomer begins by learning some of the major constellations and bright star names in the sky. Following this, the next challenge is typically to search out some of the brighter deep-sky objects. Charles Messier in the late 18th century compiled a list of 110 deep-sky objects which still represents the initial observing challenge for most amateur astronomers. Each of the 110 deep-sky objects is designated by M1, M2, M3, etc.

For example, M67, an open cluster in Cancer (see FIG. 1) is located 19.0 degrees from Procyon and 18.8 degrees from Regulus and there are no bright stars in between. It is hard to locate M67 if the sky has a limiting naked eye magnitude of 3.5, which is often the case for backyard astronomy.

OBJECTS OF THE INVENTION

A principal object of the invention is to permit deep-sky objects to be easily and reliably located in the sky, and providing the user information on the main constellations and bright star names in the sky.

SUMMARY OF THE INVENTION

According to the invention, these and further objects are attained by a method for locating in the sky celestial objects, using an optical device, comprising:
 a) making a material representation, according to their relative locations, of at least a first and a second guide stars and of the celestial object; the representation being movably mounted on the optical device;
 b) projecting in the sky the images of the representation of the guide stars; and
 c) moving the optical device and the representation, until the images of the guide stars are superposed with the respective actual guide stars in the sky.

Preferably, the optical device and the material representation are moved simultaneously.

Advantageously, the guide stars form a triangle with the celestial object, and the representation is able to rotate with respect to the optical device around an axis passing through the representation of the celestial object, the axis being orthogonal to the optical axis of the optical device.

In a preferred embodiment, the optical device is a telescope provided with an alt-azimuth type mounting.

The method may further comprise creating at least two bright dots representing the respective guide stars, and superposing in the sky the bright dots with the respective dot lights of the actual guide stars.

Preferably, the representation is made of a piece of opaque material, e.g. disc shaped, each guide star being represented by at least one small hole. In particular, one guide star is represented by two neighbor holes.

The present invention also relates to an apparatus for locating in the sky celestial objects, using an optical device, comprising:
 a) means for making a material representation, according to their relative locations, of at least a first and a second guide stars and of the celestial object; the representation being movably mounted on the optical device;
 b) means for projecting in the sky the images of the guide stars; and
 c) means for moving the optical device and the representation, until the images of the guide stars are superposed with the respective actual guide stars in the sky.

The apparatus advantageously further comprises:
 a plano convex lens optically aligned with the rotation axis of the representation piece; and
 a semi-transparent optical device inclined at 45 degrees on the rotation axis; and
 means for creating bright dots comprises a source of light disposed on one side of the representation piece.

The characteristics and advantages of the invention will appear better from the description to follow, given by way of a nonlimiting example, with reference to the appended drawings in which:

DESCRIPTION OF THE INVENTION

Figure 2:
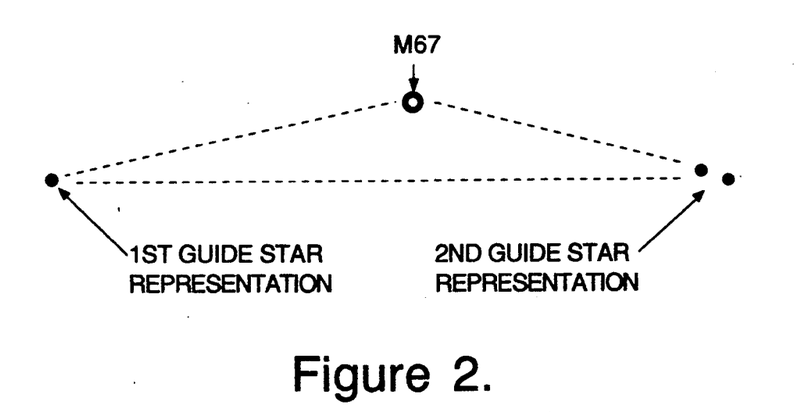
FIG. 2 is a diagrammatic representation of celestial object M67 and the two associate guide stars.

As shown on FIG. 2, the celestial object M67 forms a wide triangle with two guide stars, i.e. Regulus and Procyon with an included angle of 164 degrees. The apparatus of the invention assists in finding M67 by apparently projecting a triangle into the sky with the same angular shape and size as that formed by M67, Procyon and Regulus, see FIG. 2. As can be seen from FIG. 2, the projected triangle consists of three, different, easily recognizable, symbols of light. The representation of the guide stars can be differentiated from each other since one is formed by a single dot of light whereas the other consists of two closely spaced dots of light. The position of the deep-sky object apex is indicated by a small circle of light.

The guide stars (and optionally the celestial object) are represented by small holes on a disc made of an opaque material.

In order to find celestial object M67, one aligns the "projected" triangle with the triangle formed by the actual guide stars Procyon, Regulus and M67 in the sky. For unambiguously aligning the projected triangle, one needs to align the two guide star representation with the respective actual guide stars in the the sky. To achieve that goal, the projected triangle is rotated while moving, preferably simultaneously, the telescope in altitude and azimuth. Because the two guide star corners of the projected triangle form different images in the sky, there is no ambiguity of which projected guide star image should be placed on which star. In the example of FIG. 2, the single dot image should be placed on Regulus and the middle of the double dot image should be placed on Procyon. The projected triangle (in the sky) is able to rotate about the deep-sky object apex, around an axis of rotation aligned with the optical axis of the telescope. Provided these conditions are met, there is only one direction that the telescope can be pointed in to align the guide star representation of the projected triangle with the respective actual guide stars in the sky; in the example shown in FIGS. 1 and 2, this direction points at M67. The "circle of light" apex of the projected triangle will indicate where M67 is in the sky. The observer then returns to the eye piece of the telescope and should then be able to locate M67 inside a 1 degree field of view.

Figure 1:
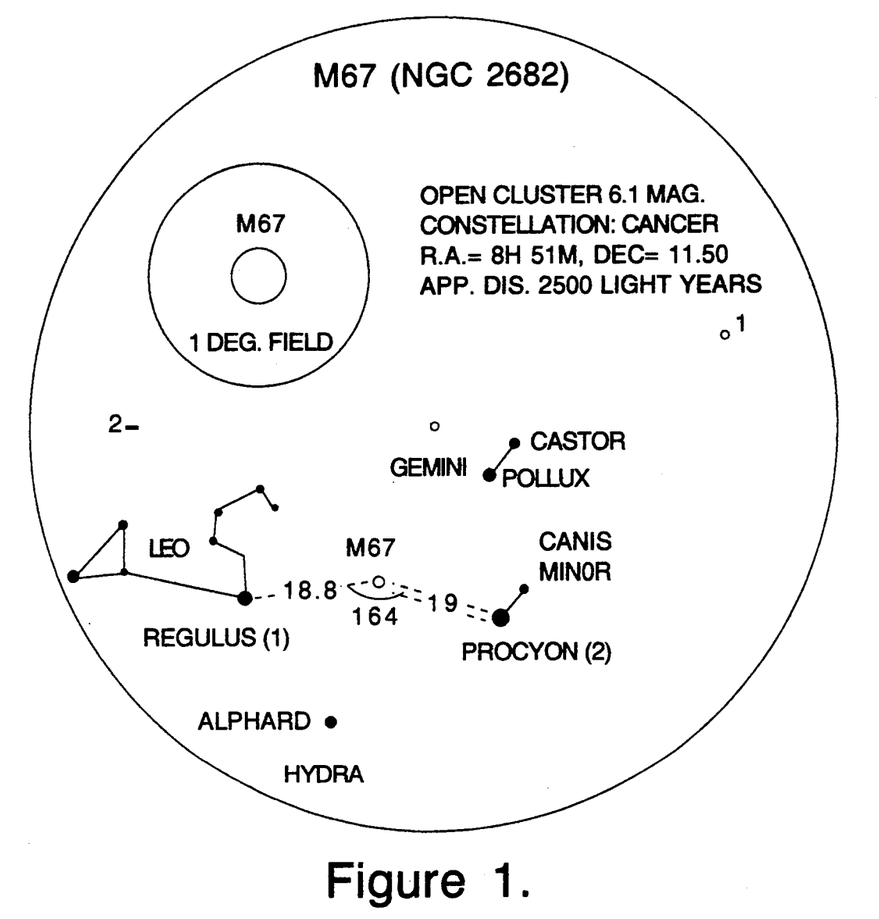
FIG. 1 shows a triangulation disc for locating celestial object M67.

There is one specific triangulation disc for each deep-sky object that needs to be located. FIG. 1 is an example of one "triangulation disc", hereafter referred to also as "disc", bearing the representation of the associated guide stars. Each disc is usually designed to help locating a single celestial object. However, two deep-sky objects located within 1 degree can be found and identified with one disc.

Additionally, each disc may contain basic information on the celestial object to be located. This information may e.g. consist of the constellation where the celestial object is found, the type of object (Galaxy, Open Cluster, Globular Cluster, Bright Nebula or Planetary Nebula), the brightness magnitude of the object, (which clearly provides information on how difficult it will be to see it), and the right ascension and declination coordinates for the deep-sky object for the year 2000. Also can be indicated the approximate distance of the object from the Earth, e.g. in light years, and a sketch showing the relative size of the deep-sky object to a circle representing a 0.5, 1 or 2 degree field of view. Other basic information may also include a wide field star map sketch showing the main constellations and bright stars in the vicinity of the deep-sky object. Each of these maps shows the two guide stars which will be used to locate the deep-sky object. One guide star is followed by (1) and the other by (2); see FIG. 1. These reference numbers indicate which of the projected guide star images should be aligned with which actual guide star star in the sky. The single dot projected image is e.g. placed on the star referenced (1) and the double dot projected image should be placed on the star referenced (2). To further reinforce this information, there is provided on the disc a single line joining star (1) with the deep-sky object and two lines joining star (2) with the deep-sky object.

Figure 3:
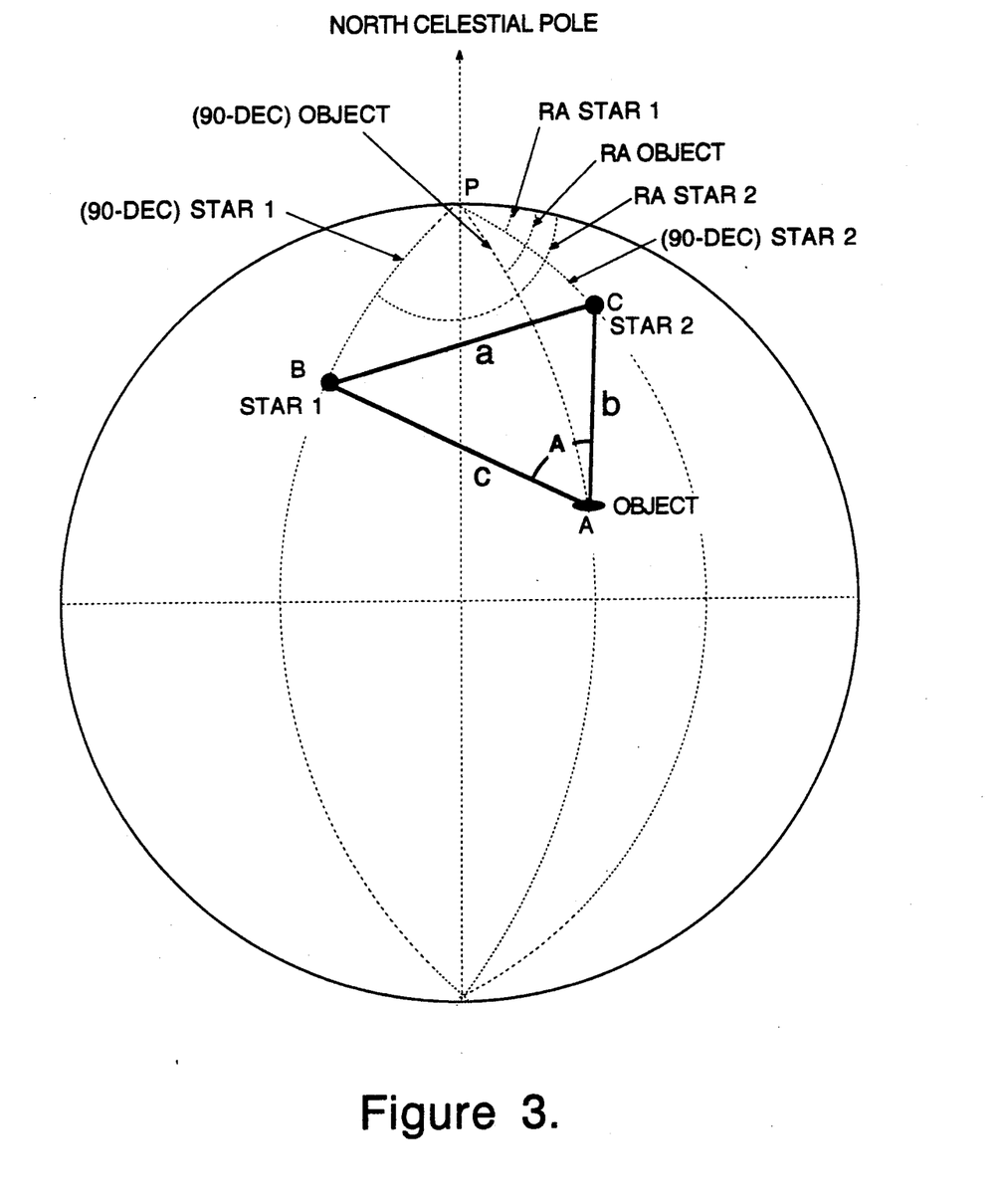
FIG. 3 is schematic spherical representation of the object to locate and its two associate guide stars.

In order to design a triangulation disc and thus apparently project calibrated triangles into the sky, the angular separation between any three celestial objects has to be calculated. These three objects would normally be two bright guide stars and the deep-sky object to be located. The basic spherical triangle that can be drawn between two stars and a deep-sky object is shown in FIG. 3. To fully define the spherical triangle ABC we need to calculate the angular distances b and c and the included angle A. The steps for achieving this from the right ascension and declination coordinates of the guide stars the and deep-sky object are given herebelow:

The angular separation between the object and STAR 1 (c), the angular separation between the object and STAR 2 (b) and the included angle A are calculated as follows:

The general formula for calculating the third side of a spherical triangle when 2 sides and the included angle A are known is:

$$\text{COS}(a) = \text{COS}(b) * \text{COS}(c) + \text{SIN}(b) * \text{SIN}(c) * \text{COS}(A) \qquad 1$$

Applying formula 1 to the spherical triangle APC enables b to be calculated, i.e., $$\text{COS}(b) = \text{COS}(90\text{-DEC STAR 2}) * \text{COS}(90\text{-DEC OBJECT}) + \text{SIN}(90\text{-DEC STAR 2}) * \text{SIN}(90\text{-DEC OBJECT}) * \text{COS}(RA \text{ OBJECT-RA STAR 2})$$

Applying formula 1 to the spherical triangle APB enables c to be calculated, i.e., $$\text{COS}(c) = \text{COS}(90\text{-DEC STAR 1}) * \text{COS}(90\text{-DEC OBJECT}) + \text{SIN}(90\text{-DEC STAR 1}) * \text{SIN}(90\text{-DEC OBJECT}) * \text{COS}(RA \text{ STAR 1} - RA \text{ OBJECT})$$

Applying formula 1 to the spherical triangle BCP enables a to be calculated, i.e., $$\text{COS}(a) = \text{COS}(90\text{-DEC STAR 1}) * \text{COS}(90\text{-DEC STAR 2}) + \text{SIN}(90\text{-DEC STAR 1}) * \text{SIN}(90\text{-DEC STAR 2}) * \text{COS}(RA \text{ STAR 1} - RA \text{ STAR 2})$$

Now that a,b and c have been calculated the included angle A can be determined, i.e., $$\text{COS}(A) = (\text{COS}(a) - \text{COS}(b) * \text{COS}(c))/(\text{SIN}(b) * \text{SIN}(c))$$

Figure 4A:
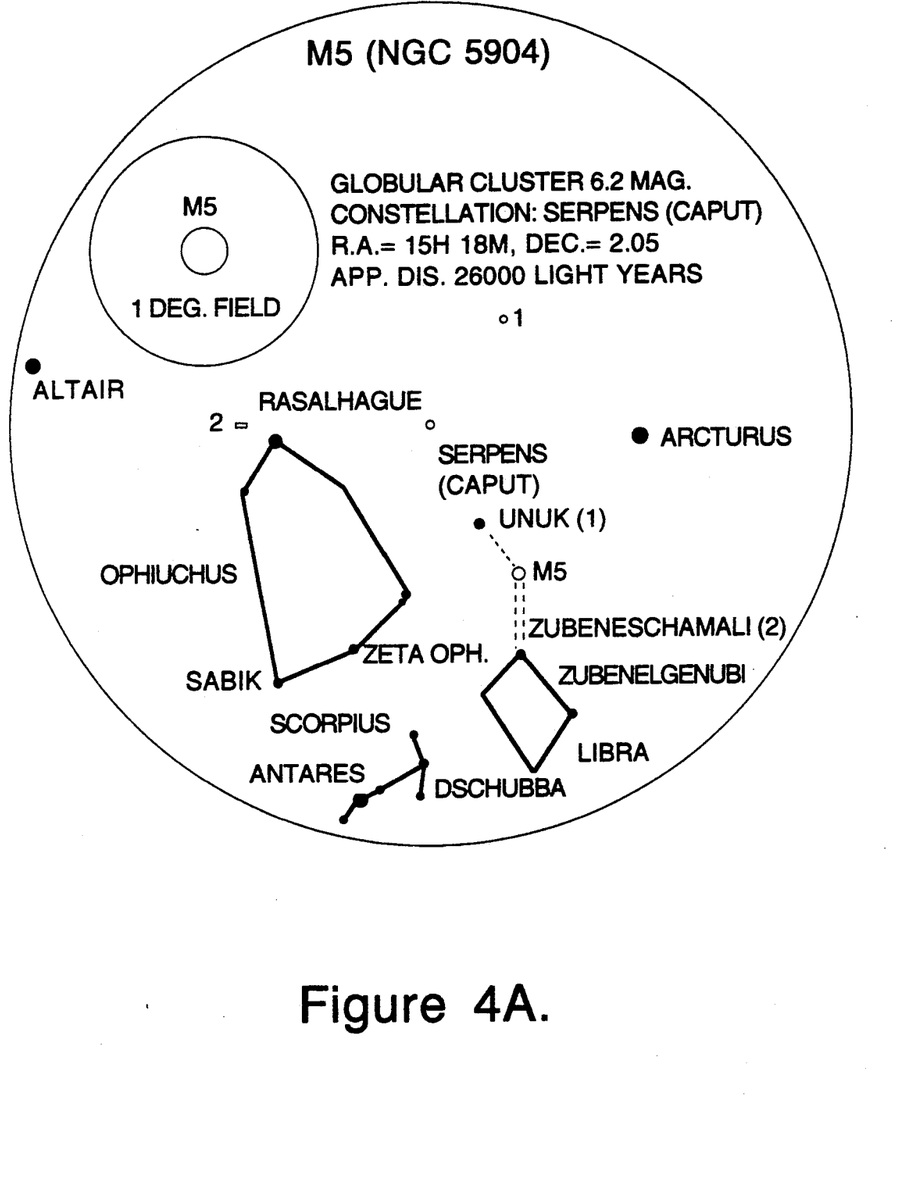
FIGS. 4A and 4B show triangulation discs for locating respectively celestial objects M5 and M14.
Figure 4B:
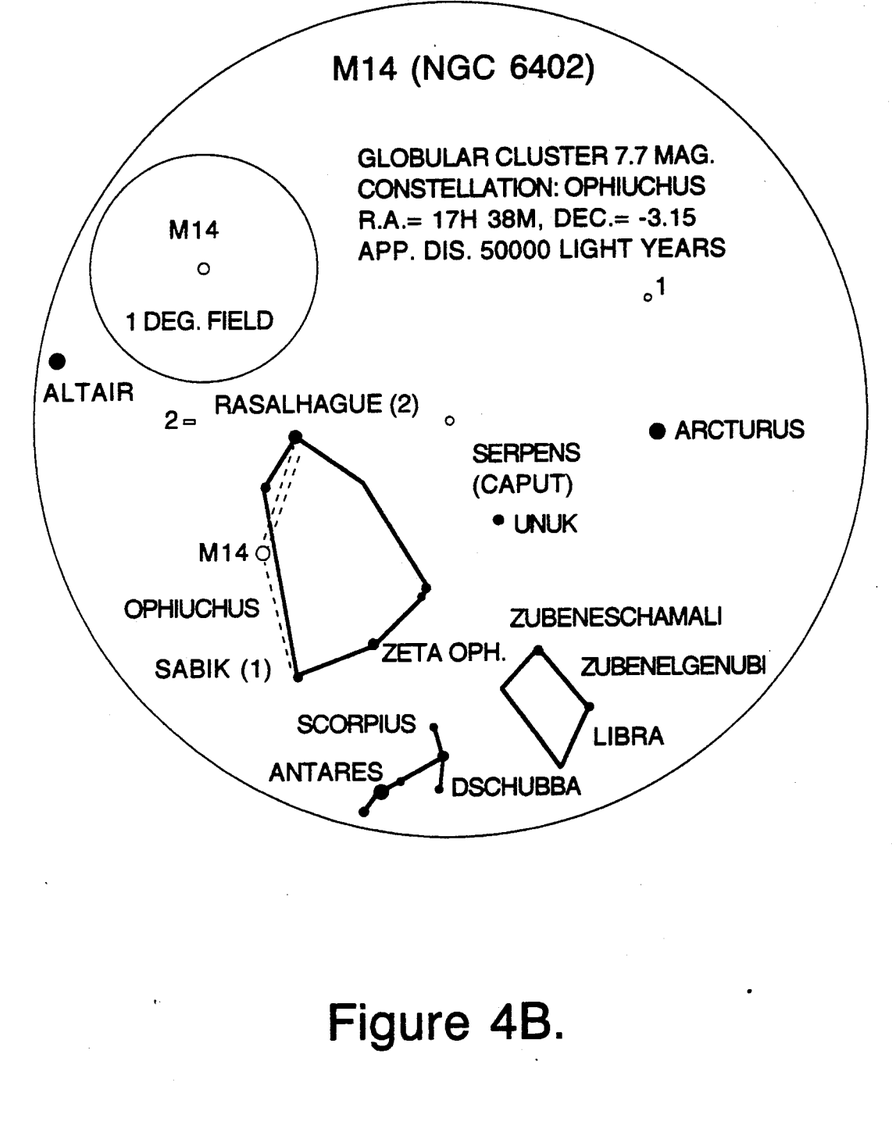

The accuracy of the apparatus of the invention improves the greater the included angle A. Angle "A" is 164 degrees in the example of FIG. 2. An angle in excess of 90 degrees is particularly adapted if suitably placed guide stars can be found within the maximum angular range of the projection system of the invention (described herebelow). The maximum angular separation between each guide star and the deep-sky object is 22.5 degrees. Therefore the maximum angle that can be subtended between the two guide stars can be up to 45 degrees. There are nearly always guide stars of 3rd magnitude or brighter in such a large segment of the sky. Other examples of triangulation discs are given in FIGS. 4A and 4B.

Figure 5:
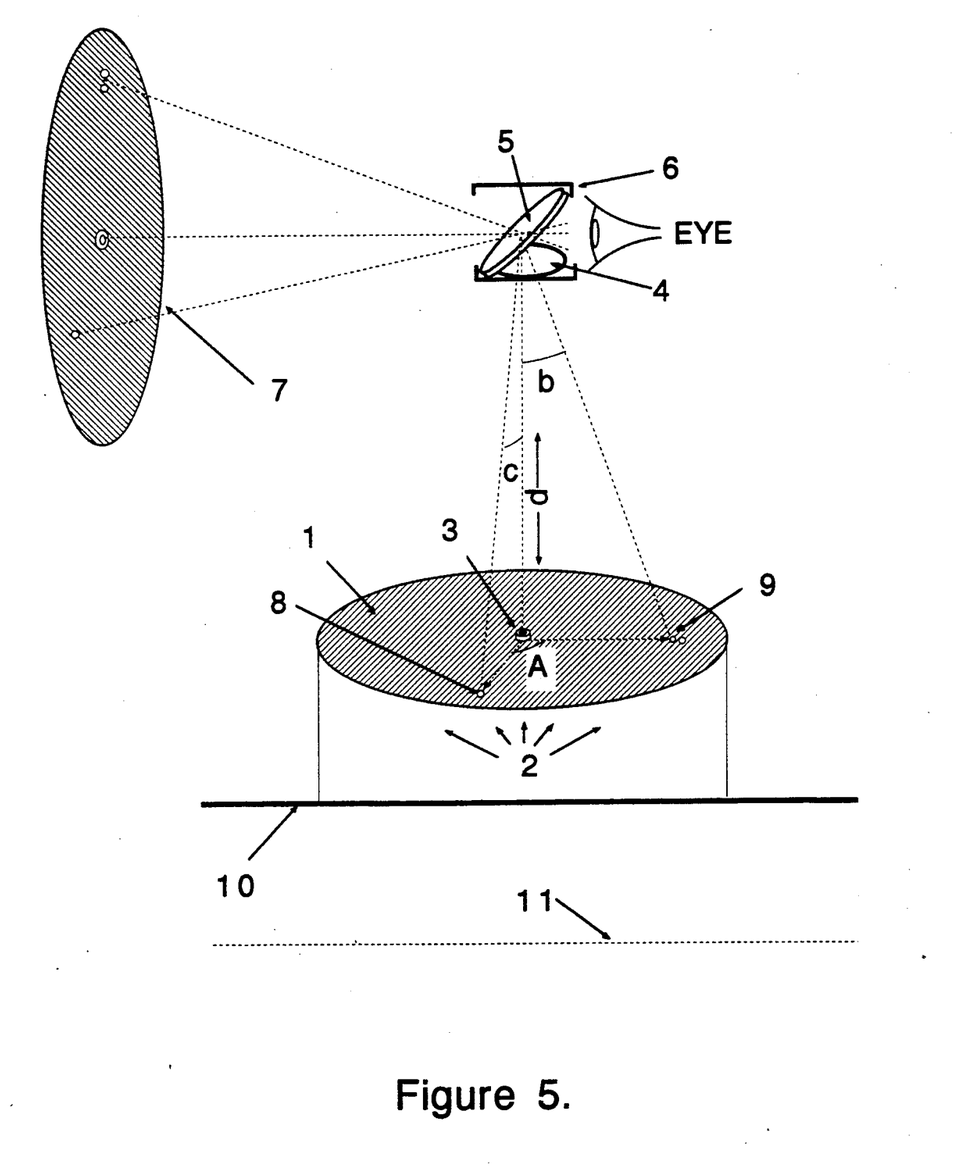
FIG. 5 is a schematic diagram of the apparatus of the invention.

A schematic drawing of the projection system is shown in FIG. 5. The opaque triangulation disc 1, which is approximately 110 mm in diameter, is illuminated from below by a red light 2. Small pin holes are pieced through the disc at the positions which correspond to the guide star coordinates. The disc is mounted on a base which allows the disc to be rotated about a central pivot 3 that corresponds to the coordinates of the deep-sky object. The relationship between the deep-sky object and the two guide stars has to be defined by spherical geometry as hereabove described in connection with FIG. 3. To apparently project the image of the triangulation disc into the sky, the projection system comprises a plano-convex lens 4 and a plastic viewer 5. The viewer 5 reflects a small percentage of the light coming from the pin holes in the triangulation disc and the central pivot (corresponding to the celestial object to be located). When the observer places his/her eye close to the eye guard 6 associated with the viewer 5, the red spot images from the triangulation disc appear to be focused amongst the stars. To project the correct spherical angular distances b and c into the sky requires them to be converted to the lengths "x" and "y" on the triangulation disc, using the following formulas:

$$y = d \tan(b)$$

$$x = d \tan(c)$$

where "d" is the focal length of the lens 4. The included spherical angle A does not need to be converted and is used directly. The actual places where the single hole and double holes are pierced in the triangulation disc are denoted by the reference 1 near the small circle and the reference 2 near the small rectangle; see FIGS. 1, 4A and 4B. A single hole is pierced through the center of the small circle and one hole is pierced at each end of the small rectangle, i.e., the double holes are about 1.5 mm apart. Because the light from the triangulation disc is reflected by the viewer disc 5, the triangulation disc is placed face down on the light table to project the correct orientation in the sky. In placing his/her eye as close as possible to the eye guard 6, the observer can have the widest possible view of the sky through the viewer 5, without having to substantially move the head. It is important that the observer keeps both eyes open to receive the maximum amount of light from the guide stars. The brain integrates the images from both eyes and it appears as though the red spot images are superimposed on the actual stars in the sky.

Figure 6:
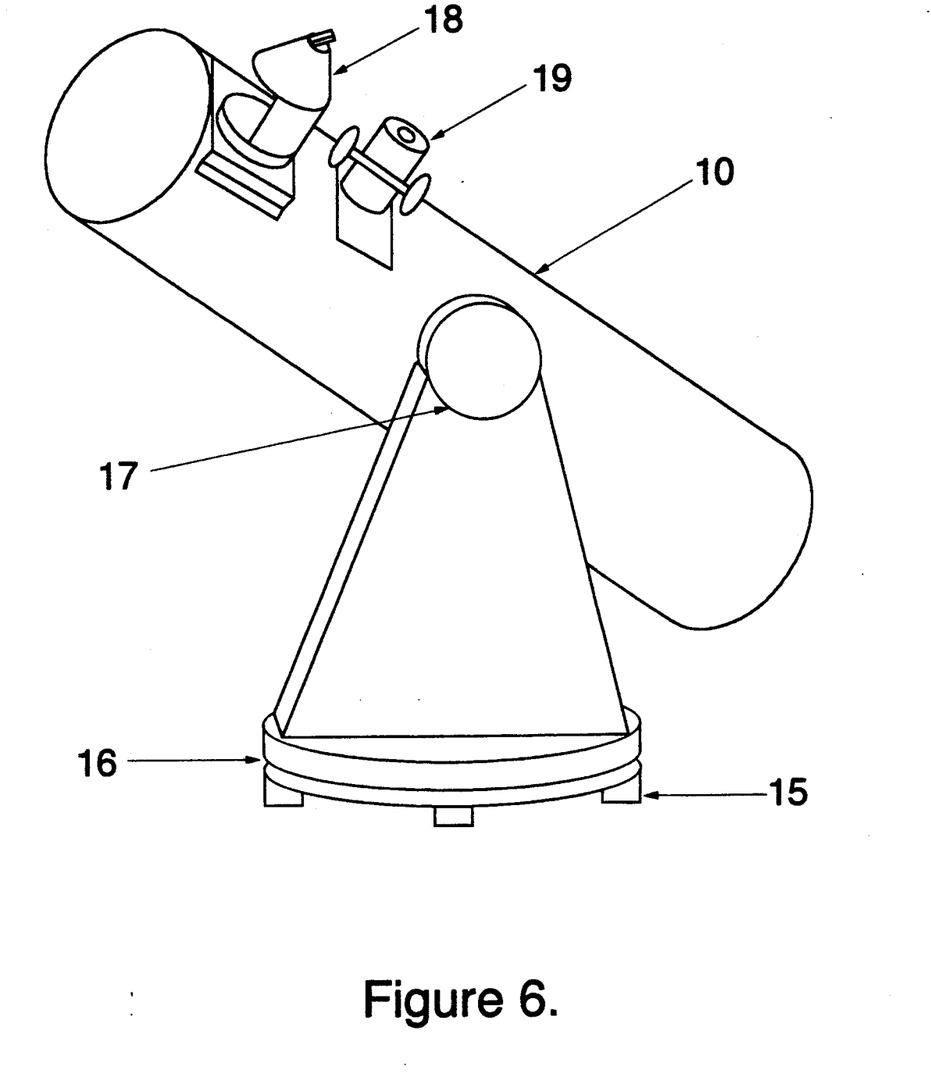
FIG. 6 is a perspective view of an alt-azimuth mount telescope provided with the apparatus of the invention.

FIG. 6 shows the preferable position on a telescope for the projection system of the invention. By mounting it up near the top it is easy to move the telescope in altitude and azimuth by grasping the top of the telescope tube leaving the thumb free to rotate the triangulation disc to align the guide stars. Other positions are of course possible provided the essential conditions are met, i.e., the observer must be able to place his/her eye close to the viewer 5, and easily move the telescope in altitude and azimuth whilst rotating the triangulation disc (e.g. with his/her thumb).

Prior to any celestial object locating session the optical axis 11, of the telescope, must be aligned with the optical axis 12, of the projection system. The method for achieving this is as follows. The observer first sights along the telescope tube 10 and aims the telescope at any bright star. The observer looks in the telescope eyepiece and centers the bright star in the field of view. Once this has been done the observer looks through the viewer 5 and by means of two adjustment screws (not shown), tilts and rotates the viewer 5 until the projected circle of light is exactly centered on the same bright star.

The present invention presents over the prior art the following advantages:
1) It effectively teaches the user the main constellations and bright star names in the sky and above all allows the user to locate and observe deep-sky objects with a minimum of frustration.
2) It enables the observer to enjoy astronomy in a 3 to 3.5 limiting magnitude sky when "star hopping" is extremely difficult.
3) There is no difficult set up or calibration required before the observing session can start.
4) Each of the individual triangulation discs provides the novice observer with the initial discipline, organization, and essential information to observe all 110 Messier objects.
5) The triangulation discs are always calibrated regardless of the month or time of the night. Their calibration is not affected by the precession of the earth's axis, therefore they will not go out of date for a very, very long time, typically many hundreds of years. The calibration of any particular triangulation disc is only affected by the proper motions of the celestial objects which are extremely small.
6) The same triangulation discs can be used anywhere in the world, regardless of latitude, longitude or northern or southern hemisphere.
7) The telescope does not have to be initially aligned in any way and does not have to be on level ground since the projection system effectively sets up its own frame of reference relative to the stars.
8) The observer keeps both eyes open when viewing through the viewer 5, making it easy to align the two projected guide star images with the selected guide stars.
9) Using blank triangulation discs and a calculator or simple hand held computer, an observer can make up his own set of, calibrated discs to observe whatever deep-sky objects he/she wishes. This feature may be particularly useful to variable star observers who need to locate the same set of stars time and time again.
10) The accuracy is such that most times the deep-sky object is within a 1 degree field of view once the guide stars have, been aligned. Any residual error comes from tolerance errors in the projection system and the tolerance errors in the position of the guide star holes and center pivot position in the triangulation discs. However, the accuracy can be dramatically improved if the observer does some fine tuning with a particular projection system and a particular set of triangulation discs. The holes in a particular triangulation disc can be re-pierced to exactly coincide with the guide stars once the deep-sky object has been centered in a high power eye-piece. Once a triangulation disc has been "tuned up", the celestial object should always be re- findable to an accuracy better than +/−0.15 degrees. The observer has thus created a highly accurate frame of reference relative to the two guide stars of that particular disc. This feature should be particularly useful for supernova hunters who wish to continue their search from a non dark-sky sight. Provided the telescope is accurately pointed at the galaxy, the supernova, should it occur, would still be visible, even if the galaxy itself is not visible.

I claim:

1. A method for locating in the sky celestial objects, using an optical device, comprising:
   a) making a material representation, according to their relative locations, of at least a first and a second guide stars and said celestial object; said representation being movably mounted on said optical device and said guide stars forming a triangle with said celestial object;
   b) projecting onto the field of view of the sky the images of the representation of said guide stars; and
   c) moving said optical device and said representation, until the images of said guide stars are superposed with the respective actual guide stars in the sky.

2. The method according to claim 1 wherein said representation is able to rotate with respect to said optical device around an axis passing through the representation of said celestial object.

3. The method according to claim 2 wherein said rotation axis is orthogonal to the optical axis of said optical device.

4. The method according to claim 1, wherein said optical device is a telescope provided with an alt-azimuth type mounting.

5. The method according to claim 1, further comprising the steps of:
   creating at least two bright dots representing the respective guide stars; and
   superposing onto the field of view of the sky said bright dots with the respective dot lights of the actual guide stars.

6. The method according to claim 5, wherein said material representation is made of a piece of opaque material, each guide star being represented by at least one small hole.

7. The method according to claim 1 wherein the optical device and the material representation are moved simultaneously.

8. The method according to claim 1 further comprising the step of aligning the optical axis of said optical device with the optical axis of the projected images.

9. The method according to claim 1 wherein the respective representations of said guide stars are differentiated from each other.

10. An apparatus for locating in the sky celestial objects, using an optical device, comprising:
    a) means for making a material representation, according to their relative locations, of at least a first and a second guide stars and of said celestial object; said representation being movably mounted on said optical device and said guide stars forming a triangle with said celestial object;
    b) means for projecting onto the field of view of the sky the images of the representation of said guide stars; and
    c) means for moving simultaneously said optical device and said representation, until the images of said guide stars are superposed with the respective actual guide stars in the sky.

11. The apparatus according to claim 10 wherein said representation is able to rotate with respect to said optical device around an axis passing through the representation of said celestial object.

12. The apparatus according to claim 10 wherein said representation is able to rotate around an axis orthogonal to the optical axis of said optical device.

13. The apparatus according to claim 10 wherein said optical device is a telescope provided with an alt-azimuth type mounting.

14. The apparatus according to claim 10 further comprising:
    means for creating at least two bright dots representing the respective guide stars; and
    means for superposing onto the field of view of the sky said two bright dots with the respective dot lights of the actual guide stars.

15. The apparatus according to claim 14 wherein one guide star is represented on said representation piece by two neighbor holes, and the other guide star is represented by a single small hole.

16. The apparatus according to claim 10 wherein said material representation is made of a piece of opaque and substantially rigid material.

17. The apparatus according to claim 16 wherein said representation piece is disc shaped.

18. The apparatus according to claim 10 wherein the respective representations of said guide stars are differentiated from each other.

19. The apparatus according to claim 10 further comprising:
    a plano convex lens optically aligned with the rotation axis of said representation piece; and
    a semi-transparent mirror inclined at 45 degrees on said rotation axis.

* * * * *